US012298857B2

(12) United States Patent
Radha et al.

(10) Patent No.: US 12,298,857 B2
(45) Date of Patent: May 13, 2025

(54) GENERIC "DIFFERENTIAL DISCOVERY SERVICE" FOR USE IN ANY STORAGE ARRAY TO PROVIDE DIFFERENTIAL DISCOVERY OF THE INFRASTRUCTURE ASSETS TO ANY CLIENT

(71) Applicant: Dell Products L.P., Round Rock, TX (US)

(72) Inventors: Jayashree Radha, Bangalore (IN); Astha Arora, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/482,429

(22) Filed: Oct. 6, 2023

(65) Prior Publication Data
US 2025/0117295 A1    Apr. 10, 2025

(51) Int. Cl.
G06F 17/00    (2019.01)
G06F 11/14    (2006.01)
G06F 16/23    (2019.01)

(52) U.S. Cl.
CPC ...... *G06F 11/1451* (2013.01); *G06F 16/2358* (2019.01); *G06F 2201/80* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| 10,200,877 | B1 * | 2/2019 | Skidmore | H04W 16/22 |
| 10,210,167 | B1 * | 2/2019 | Sorenson, III | H04L 67/568 |
| 11,232,383 | B1 * | 1/2022 | Burns, Sr. | G06Q 10/0637 |
| 12,056,014 | B2 * | 8/2024 | Pawar | G06F 11/1448 |
| 2006/0080656 | A1 * | 4/2006 | Cain | G06F 8/65 434/118 |
| 2015/0212893 | A1 * | 7/2015 | Pawar | G06F 11/1456 707/649 |
| 2015/0227602 | A1 * | 8/2015 | Ramu | G06F 11/1456 707/634 |
| 2016/0034481 | A1 * | 2/2016 | Kumarasamy | G06F 16/128 707/639 |
| 2016/0042090 | A1 * | 2/2016 | Mitkar | G06F 11/1448 707/649 |
| 2016/0077926 | A1 * | 3/2016 | Mutalik | G06F 16/1844 711/162 |

(Continued)

*Primary Examiner* — Hung D Le
(74) *Attorney, Agent, or Firm* — Workman Nydegger

(57) ABSTRACT

One example method includes receiving a first message specifying that one or more changes have been made to infrastructure assets of a storage array. In response to receiving the first message, a change table stored in a database is updated to specify the one or more changes made to the infrastructure assets, the change table including a unique index offset value for each of the one or more changes. Based on the unique index offset value, it is determined if the one or more changes are to be communicated to a backup engine or client. When it is determined that the one or more change are to be communicated to the backup engine or client, a second message is sent to the backup engine or client that notifies the backup engine or client of the one or more changes made to the infrastructure assets of the storage array.

20 Claims, 7 Drawing Sheets

(56) References Cited

U.S. PATENT DOCUMENTS

| | | | |
|---|---|---|---|
| 2016/0314046 A1* | 10/2016 | Kumarasamy | G06F 11/1435 |
| 2017/0060918 A1* | 3/2017 | Iyer | G06F 3/0685 |
| 2017/0228137 A1* | 8/2017 | Carlos | G06F 3/0488 |
| 2017/0315728 A1* | 11/2017 | Zheng | G06F 3/0604 |
| 2017/0353302 A1* | 12/2017 | Fernandez | H04L 9/14 |
| 2018/0096007 A1* | 4/2018 | Liu | G06F 16/24556 |
| 2019/0116006 A1* | 4/2019 | Lunttila | H04W 72/0446 |
| 2020/0034443 A1* | 1/2020 | Kentley | G06F 16/284 |
| 2021/0034408 A1* | 2/2021 | Spivak | G06F 11/1438 |
| 2021/0326309 A1* | 10/2021 | Natarajan | G06F 16/162 |
| 2022/0414103 A1* | 12/2022 | Upadhyay | G06F 16/256 |
| 2023/0062319 A1* | 3/2023 | Reineke | H04L 41/18 |
| 2023/0198757 A1* | 6/2023 | Sapuntzakis | G06F 3/067 380/277 |
| 2024/0126658 A1* | 4/2024 | Bagchi | G06F 9/45558 |

* cited by examiner

255

| | Backup Engine 290 | | | |
|---|---|---|---|---|
| Asset ID 310 | Asset Type 320 | Change Type 330 | Index Offset Value 340 | Last Index Offset Value 350 |
| 1234 | Volume | Update | 001 | Yes |
| ... | ... | ... | ... | |
| 2345 | Volume Group | Delete | 100 | |

Backup Engine 290

| Asset ID 310 | Asset Type 320 | Change Type 330 | Index Offset Value 340 | Last Index Offset Value 350 |
|---|---|---|---|---|
| 1234 | Volume | Update | 001 | |
| ... | ... | ... | ... | |
| 2345 | Volume Group | Delete | 100 | Yes |
| 3456 | Volume | Add | 101 | |
| 4567 | Volume | Add | 102 | |

| | Backup Engine 290 | | | |
|---|---|---|---|---|
| Asset ID 310 | Asset Type 320 | Change Type 330 | Index Offset Value 340 | Last Index Offset Value 350 |
| 1234 | Volume | Update | 001 | |
| ... | ... | ... | ... | |
| 2345 | Volume Group | Delete | 100 | |
| 3456 | Volume | Add | 101 | |
| 4567 | Volume | Add | 102 | Yes |

GENERIC "DIFFERENTIAL DISCOVERY SERVICE" FOR USE IN ANY STORAGE ARRAY TO PROVIDE DIFFERENTIAL DISCOVERY OF THE INFRASTRUCTURE ASSETS TO ANY CLIENT

FIELD OF THE INVENTION

Embodiments of the present invention generally relate to data protection. More particularly, at least some embodiments of the invention relate to systems, hardware, software, computer-readable media, and methods for implementing a differential discovery service in a storage array.

BACKGROUND

Data may be created, stored, and backed up, using a variety of different system configurations. Consider, for example, a case where one or more file systems in an application host are mounted on logical volume groups (LVG) on the application host that map to physical volumes of a storage array, such as the Dell EMC Power Store platform for example. When such file systems needed to be protected, such as by the Dell EMC PowerProtect Data Manager (PPDM) for example, the discovery of the file systems from PPDM will also require a discovery operation to read the details of the underlying storage volumes for each file system.

Although the discovery operation is able to identify the details of the underlying storage volumes, the storage array does not currently support a "differential discovery" mechanism for identifying specific changes the assets since the last discovery operation that was performed. This makes the discovery operation cumbersome and costly in terms of resource usage.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIGS. 3A-3C disclose aspects of a change table according to an embodiment.

DETAILED DESCRIPTION OF SOME EXAMPLE EMBODIMENTS

Figure 1:
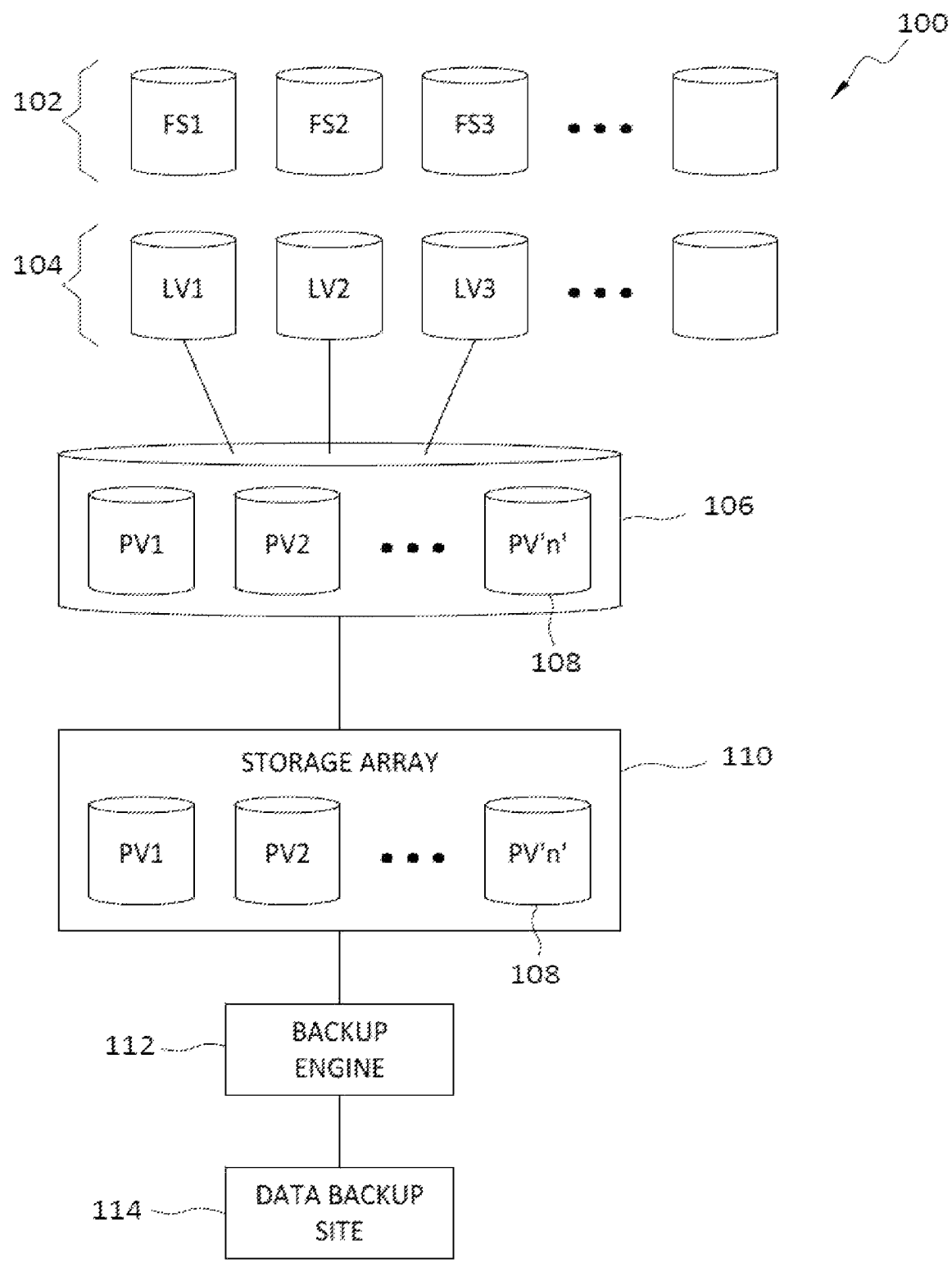
FIG. 1 discloses aspects of an example architecture according to an embodiment.

Some embodiments of the present invention generally relate to data protection. More particularly, at least some embodiments of the invention relate to systems, hardware, software, computer-readable media, and methods for implementing a differential discovery service in a storage array.

One example method includes receiving a first message specifying that one or more changes have been made to infrastructure assets of a storage array. In response to receiving the first message, a change table stored in a database is updated to specify the one or more changes made to the infrastructure assets, the change table including a unique index offset value for each of the one or more changes. Based on the unique index offset value, it is determined if the one or more changes are to be communicated to a backup engine or client. When it is determined that the one or more change are to be communicated to the backup engine or client, a second message is sent to the backup engine or client that notifies the backup engine or client of the one or more changes made to the infrastructure assets of the storage array.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an advantageous aspect of one embodiment of the invention is that a generic differential discovery service can be seamlessly integrated into a storage array. The differential discovery service allows a backup engine or client to detect only the changes in the storage array assets as they occur in the storage array, without the need to discover everything in the storage array every time a discovery operation is performed. This advantageously reduces the resource usage and cost when compared to exiting discovery operations. Various other advantages of some example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may comprise any number 'n' of filesystems (FS) 102, where 'n' is any integer equal to or greater than one. The filesystems 102, need not be of any particular type, and may store any number and type(s) of files. A filesystem 102 may be included in, or otherwise associated with, a logical volume (LV) 104. The logical volumes 104 may be of any size, type, and number. For example, there may be any number 'n' of LVs 104, where 'n' is any integer equal to or greater than one.

In an embodiment, one or more logical volumes 104 may be created from one or more logical volume groups (LVGs) 106 which may, in turn, comprise a virtual grouping of one or more physical volumes (PVs) 108 that reside in a storage array 110, one non-limiting example of which is the Dell EMC Power Store platform. there may be any number 'n' of PVs 108, where 'n' is any integer equal to or greater than one. In an embodiment, a storage array may comprise thousands, or more, of PVs.

One or more LVGs 106 may be defined, such as by an administrator for example, to respectively embrace any number and/or grouping of PVs 108 of the storage array 110, and the grouping of PVs 108 within an LVG 106 may be modified at any time. As well, an LVG 106 may be defined, or dissolved, at any time.

The storage array 110 may include any type, size, and number of PVs 108. The PVs 108 embraced within any particular LVG 106 may vary from one LVG 106 to another LVG 106. Further, a PV 108 may be embraced within an LVG 106 for one backup operation, and within a different LVG 106 for another backup operation. Thus, the PVs 108 embraced within an LVG 106 may vary over time. Further, one or more LVGs 106 may be defined at any time. One or more LVGs 106 may correspond to different respective groupings of the PVs 108 in the storage array 110. Put another way, a PV 108 may map to a host, or hosts, that host respective groups of one or more FSs 102. In this way, the FSs 102 may, in effect, be stored, or mounted, at the storage array 110.

With continued reference to FIG. 1, the example operating environment 100 may comprise a backup engine or client 112, one non-limiting example of which is the Dell EMC PowerProtect Data Manager (PPDM), that may be operable to perform backup operations on data stored at the storage array 110. The engine or client 112 may comprise a backup application operable to create, and backup, backup datasets to a data backup site 114, one non-limiting example of which is the Dell EMC DataDomain platform.

While performing the backup operations, the backup engine or client 112 performs a "discovery" operation on the storage array 110. This operation identifies the infrastructure assets (also referred to herein as "assets" or "asset"), for example volumes/volume groups/storage groups for block volume protection, NAS shares, etc., that are eligible for protection from the storage arrays. The occurrence of the discovery operation is configurable by a user based on application needs, but is typically scheduled to occur at regular intervals, such as every 30 minutes for block volumes.

Although the discovery operation is able to identify the assets, the storage array 110 does not currently support a "differential discovery" mechanism for identifying specific changes the assets since the last discovery operation performed by the backup engine or client 112. This makes the discovery operation cumbersome as shown by the following lists of problems:

(1) During every discovery operation cycle, the backup engine or client 112 is required to retrieve the entire set of assets each time and perform a comparison with what already exists in the backup engine or client 112's persistent store to determine the modifications that have occurred. This is very expensive on scale due the large amount of computing resources needed.

(2) In order to ascertain whether a volume/volume group in the storage array 110 has been deleted, the backup engine or client 112 must undertake several steps. First, the backup engine or client 112 needs to compare the list of assets obtained from the storage array 110 during the current discovery call with what has already been discovered and stored in the backup engine or client 112's persistent store. Additionally, the backup engine or client 112 needs to perform a few more queries to the storage array 110 to validate whether an asset has genuinely been deleted or if the absence of the asset is due to an error in the discovery process.

(3) Despite minimal or no changes in the storage array 110 since the backup engine or client 112's previous discovery cycle, the backup engine or client 112 is still required to update the same records in its persistent store during each discovery cycle. This necessity arises because the infrastructure asset objects contain multiple fields. However, performing a detailed comparison of every field value to identify actual changes in each asset is a computing resource-intensive process.

(4) Due to the absence of a notification mechanism from the storage array 110 indicating changes, the discovery process relies on a backup engine or client 112-initiated polling. As a result, the system can only offer eventual consistency. This means that there may be a time window where changes occur in the assets of the storage array 110, but the backup engine or client 112 has not yet discovered them. Consequently, a user must either perform a manual discovery process or wait for the next discovery cycle of the backup engine or client 112 to capture the changes and synchronize the records from the storage array 110. If the number of changes to the assets is large during the time window before the backup engine or client 112 discovers them, potential problems may arise if the backup of the assets is needed.

B. Aspects of Some Example Embodiments

The embodiments disclosed herein provide for a generic differential discovery service that can be seamlessly integrated into a storage array such as the storage array 110. The differential discovery service allows a backup client such as the backup engine or client 112 to detect only the changes in the assets as they occur in the storage array, without the need to discover everything in the storage array every time a discovery operation is performed. This advantageously reduces the resource usage and cost when compared to exiting discovery operations.

Figure 2:
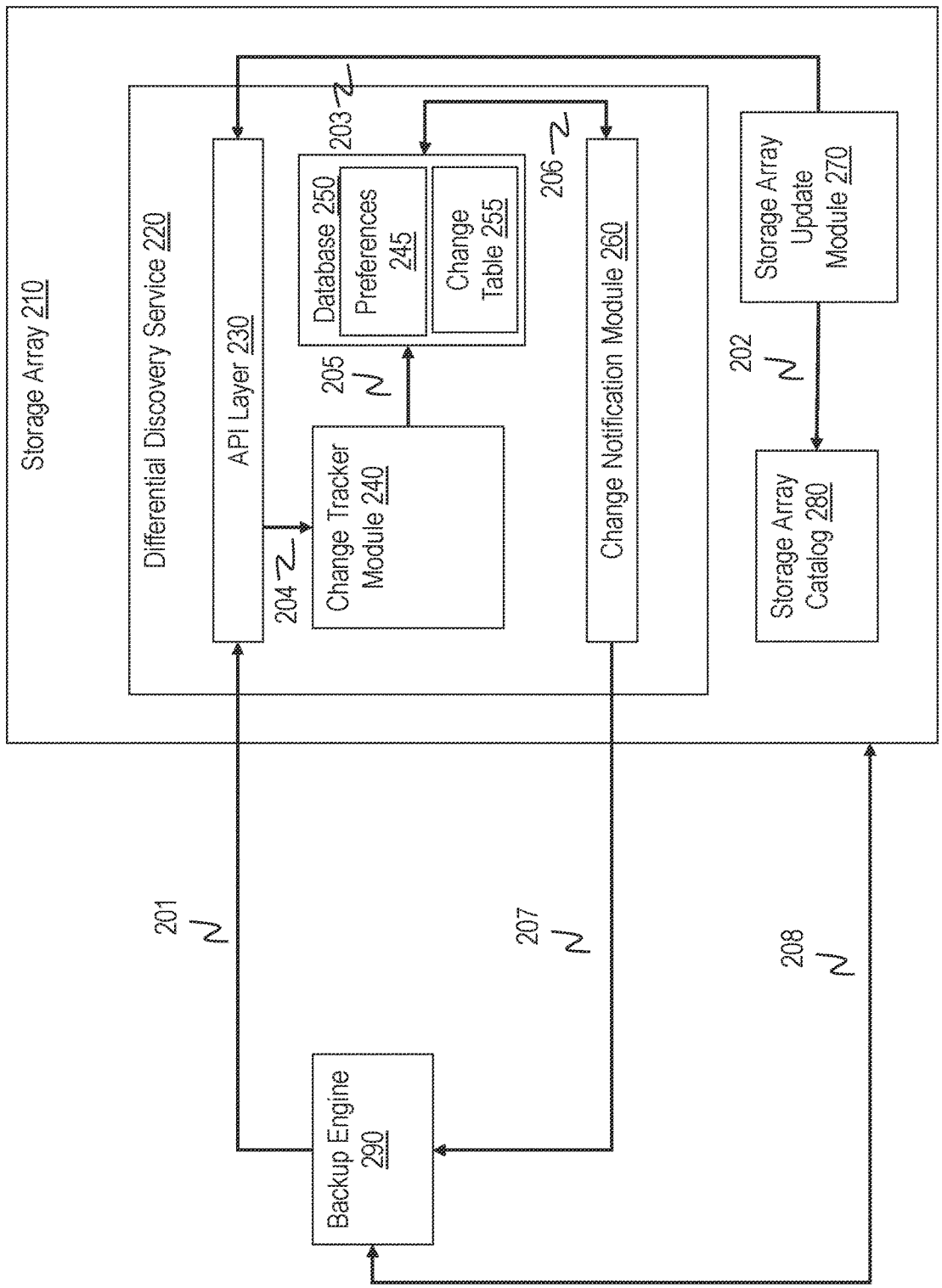
FIG. 2 discloses aspects of a differential discovery service according to an embodiment.

FIG. 2 illustrates an embodiment of a differential discovery service 220. As illustrated, the differential discovery service 220 is integrated into a storage array 210, which may correspond to the storage array 110. In some embodiments, the differential discovery service 220 is automatically started when the storage array 210 software services are started. In other embodiments, the differential discovery service 220 is started based on demand as required by a user.

The differential discovery service 220 includes an API layer 230. In operation, the API layer 230 includes a notification subscription API that allows a backup engine or client 290, which may correspond to the backup engine or client 112, to subscribe to the differential discovery service 220 for notifications about changes to the storage array 210 assets that the backup engine or client 290 is interested in receiving. For example, in some embodiments, the backup engine or client 290 may want to receive notifications about any changes done to the storage array assets, that is any create or add operations, any read operations, any update or write operations, or any delete operations. Thus, the backup engine or client 290 has the ability to send a notification subscription message 201 using the notification subscription API to indicate that it would like to receive notifications about any CRUD (create (add), read, update, or delete) operation performed on the storage array 210 assets. In other embodiments, however, the backup engine or client 290 may want to only receive notifications about a subset of the CRUD operations, such as delete only, and may send a notification subscription message 201 indicating that it would only like to receive the subset of CRUD operations. Thus, the notification subscription API in the API layer 230 empowers the backup engine or client 290 to be in control of which changes to the storage assets it will detect.

The following shows an example embodiment of the notification subscription API:

API for Subscription (Clients Will Call this API to Subscribe for Notifications)
    /api/subscription_for_differential_discovery
    {
        Subscriber Address: <IP/FQDN>
        Subscriber Name: < >
        Subscriber Login Details: {creds (encrypted), login API}
        CallBack URI: <The URI that will be used for call back during notification>
        ChangeTypesForNotification: [DELETE, ADD, UPDATE]
        ResourceTypesForNotification: [VOLUMES, VOLUME GROUPS, STOARGE_GROUPS]

In some embodiments, the API layer 230 includes a resource type API. The resource type API sends a message that informs the backup engine or client 290 of the resource types that it can subscribe to receive notifications for. The following shows an example embodiment of the resource type API:
    GET/api/infrastructureAssetTypesSupported:
        {returns the infrastructure asset types}
        This will make a call to the corresponding storage array APIs to get the infrastructure asset types in that array.

The API layer 230 also includes a publish API. The publish API is used by the storage array 210 to inform the differential discovery service 220 of any changes to the storage array 210 assets. As illustrated, the storage array 210 includes a storage array update module 270 and a storage array catalog 280. Whenever there is an update to the infrastructure assets of the storage array 210, the storage array update module 270 updates 202 the storage array catalog 280 with the changes. In addition, the storage array update module 270 utilizes the publish API to send a message 203 that informs the differential discovery service 220 of the changes. The use of the publish API provides scalability to the differential discovery service 220 as it allows the storage array 210 to simply publish a publish message 203 using the publish API any time changes occur to the storage array assets. Thus, the differential discovery service is able to receive notification about a a large number of changes in the assets and then to process these changes.

The following shows an example embodiment of the publish API:
    POST/api/publish_changes
    {
        resourceId: <The unique asset id of the entity>
        changeType: <Addition/Deletion/Modification>
            ResourceType: <Volume/VolumeGroup/Clone/Storage_group etc.>
            Timestamp: < >
    }

The differential discovery service 220 includes a change tracker module 240. In operation, the change tracker module 240 receives and processes 204 the various messages from the API layer 230. For example, the change tracker module 240 receives and processes 204 the notification subscription message 201 received by the notification subscription API from the backup engine or client 290. Based on the notification subscription messages received from the backup engine or client 290, the change tracker module 240 generates a preference table 245 for the backup engine or client 290. The preference table 245 specifies which types of CRUD operations the backup engine or client 290 is interested in receiving notifications for. As mentioned previously, this can include the all CRUD operations or a subset thereof. The preference table can be stored in a differential discovery service 220 database 250.

The change tracker module 240 also receives and processes 204 the messages 203 received by the publish API from the storage array update module 270. As mentioned previously, the publish messages 203 inform the differential discovery service 220 of changes to the storage array assets.

The change tracker module 240 then uses the messages 201 and 203 to update 205 a change table 255 (or generate and update if the change table 255 did not previously exist) for the backup engine or client 290. The change table 255 contains the specific asset changes that should be communicated to the backup engine or client 290. For example, suppose a new volume is added to the storage array 210 and a publish message 203 from the storage array update module 270 informs of this addition. Further suppose that a notification subscription message 201 indicated that the backup engine or client 290 wants to receive notifications about volumes that are added, and such preference is indicated in the preference table 245. In such case, the change tracker module 240 would update 205 a change table 255 that indicated that the backup engine or client 290 is to be notified of the volume that has been added to the storage array 210.

FIG. 3A illustrates an embodiment of a change table 255 that is generated for the backup engine or client 290. For ease of explanation, the example change table 255 only shows a few rows, although there may be a large number of rows for a storage array with a large number of assets. As illustrated, the example change table 255 includes an asset ID 310 column that indicates a unique ID for an asset that has been changed. An asset type 320 column specifies the type of the asset that has been changed. A change type 330 column specifies the change type that has occurred. An index offset value 340 column includes a unique index offset value for the asset that has changed.

For example, a row 301 has an asset ID of "1234", an asset type of "volume", a change type of "update", and an index offset value of "001". This row indicates that initially the change tracker module 240 received and processed a publish message 203 that indicated that the volume having the asset ID of "1234" had been updated. The row was given the index offset value of 001 because it was the first change recorded in the table.

As additional messages 203 are received and processed, additional entries are made in the table in additional rows 302 as indicated by the ellipses. The row 303 has an asset ID of "2345", an asset type of "volume group", a change type of "delete", and an index offset value of "100". This row indicates that the change tracker module 240 received and processed a publish message 203 that indicated that the volume group having the asset ID of 2345 had been deleted.

The differential discovery service 220 also includes a change notification module 260. In operation, the change notification module 260 accesses the change table 255 to determine 206 what changes need to be communicated to the backup engine or client 290. For example, returning to FIG. 3A, the change notification module 260 may read the most recent index offset value to determine those changes that need to be communicated.

The example change table 255 also includes a last index offset value 350 column. The change notification module 260 uses the last index offset value 350 column to mark or flag the last change that was communicated to the backup engine or client 290. In FIG. 3A the last index offset value 350 column is marked "yes" for row 301, thus indicating that change specified in row 301 has previously been communicated and that all changes specified in the subsequent rows will need to be communicated.

Accordingly, the change notification module 260 sends a notification message 207 to the backup engine or client 290 that notifies the backup engine or client 290 of the changes made to the storage array 210 assets. The notification message 207 will include the asset ID 310 of the affected assets and the change type 330 of the affected assets, but does not include any of the actual asset details such as the details of contents of an added volume or volume group. For example, the notification message 207 would include the asset ID 310 "2345" and the change type 330 "delete" from the row 303 as well as equivalent information from the additional rows 302 illustrated by the ellipses. Thus, the backup engine or client 290 is only notified that a change has occurred to a specific asset or group of assets.

Once the change notification module 260 sends the notification message 207, the change notification module 260 records in the change table 255 the last index offset that is associated with the asset ID and change type that were communicated to the backup engine or client 290. Since in the current embodiment the last index offset value associated with the asset ID and change type that were communicated to the backup engine or client 290 is the index offset value "100" of row 303, as shown in FIG. 3B the change notification module 260 records this in the change table 255 by recording a "yes" in row 303 in the last index offset value 350 column. In this way, the change notification module 260 need only review the change table 255 for any entries beyond row 303 containing an index offset value 340 of "101" and higher when determining 206 what changes need to be communicated to the backup engine or client 290, thus reducing resource usage.

As mentioned previously, the notification message 207 only informs that backup engine or client 290 that a change has occurred to a specific asset or group of assets, but does not include any of the asset details. Accordingly, the backup engine or client 290 may send a message 208 to the storage array 210 requesting the actual asset details. For example, the message 208 can request the details about the volume group that was deleted in the changes specified on row. In some embodiments, the message 207 can be a GET API call that provides the asset ID 310 as a parameter. The assets details can then be provided to the backup engine or client 290 for processing and storage according to the operational parameters of the backup engine or client 290. Accordingly, the backup engine or client 290 does not need to retrieve the full set of storage array 210 assets and then compare these with the those already stored in the backup engine or client 290 to determine what changes have occurred. Rather, the backup engine or client 290 only receives those assets (or a desired subset of the assets) where a change has actually occurred. These changes can then be processed and stored, thus greatly reducing the resource costs associated with performing a discovery operation.

A specific embodiment of the operation of the storage array 210 and the differential discovery service 220 will now be explained. Suppose that two volumes are added as assets to the storage array 210. Also suppose that the backup engine or client 290 has previously sent a notification subscription message 201 using the notification subscription API of the API layer 230 to indicate that it would like to receive notifications about additions of assets to the storage array 210.

When the two volumes are added, the storage array update module 270 updates 202 the storage array catalog 280 with the additions of the two volumes. In addition, the storage array update module 270 utilizes the publish API of the API layer 230 to send a publish message 203 that informs the differential discovery service 220 of the additions of the two volumes.

The change tracker module 240 receives and processes 204 the messages 203 received by the publish API from the storage array update module 270. The change tracker module 240 then updates 205 the change table 255 for the backup engine or client 290. As shown in FIG. 3B, the change tracker module 240 writes the rows 304 and 305 to the change table 255. For example, the row 304 has an asset ID of "3456", an asset type of "volume", a change type of "add", and an index offset value of "101". The row 304 has an asset ID of "4567", an asset type of "volume", a change type of "add", and an index offset value of "102". It will be appreciated that the index offset values are "101" and "102" because they are the next values added after the index offset value of "100" of the row 303.

The change notification module 260 then accesses the change table 255 to determine 206 what changes need to be communicated to the backup engine or client 290. For example, returning to FIG. 3B, the change notification module 260 reads the "yes" in the last index offset value 350 column for index offset value "100" of row 303. Accordingly, the change notification module 260 is able to determine 206 that only the changes recorded in the change table 255 after the index offset value "100" need be communicated to the backup engine or client 290.

It will be appreciated that the change notification module 260 may access the change table 255 to determine if any changes have been added to the change table using a predetermined time frequency. In one embodiment, the change notification module 260 may access the change table at a time frequency of every five minutes. In other embodiments, however, the time frequency may be less than or more than five minutes and can be set according to user needs. However, setting a relatively short time frequency will ensure that any changes that are made to the assets of the storage array 210 are communicated to the backup engine or client 290 near the time the changes occur, thus helping to reduce the time period that the backup engine or client 290 does not include the details about the asset changes.

The change notification module 260 sends a notification message 207 to the backup engine or client 290 that notifies the backup engine or client 290 of the changes made to the storage array 210 assets. For example, the notification message 207 includes the asset ID 310 "3456" and the change type 330 "add" from the row 304 and asset ID 310 "4567" and the change type 330 "add" from the row 305.

Once the change notification module 260 sends the notification message 207, the change notification module 260 records in the change table 255 the last index offset that is associated with the asset ID and change type that were communicated to the backup engine or client 290. Accordingly, as shown in FIG. 3C the change notification module 260 records this in the change table 255 by recording a "yes" in row 305 in the last index offset value 350 column. In this way, the change notification module 260 need only review the change table 255 for any entries beyond row 305 containing an index offset value 340 of "103" or higher when determining 206 what changes need to be communicated to the backup engine or client 290, thus reducing resource usage.

The backup engine or client 290 then sends a message 208 to the storage array 210 requesting the actual asset details.

For example, the message 208 can request the details about the two volumes that were added as specified on rows 304 and 306. The assets details can then be provided to the backup engine or client 290 for processing and storage according to the operational parameters of the backup engine or client 290.

C. Example Methods

Figure 4:
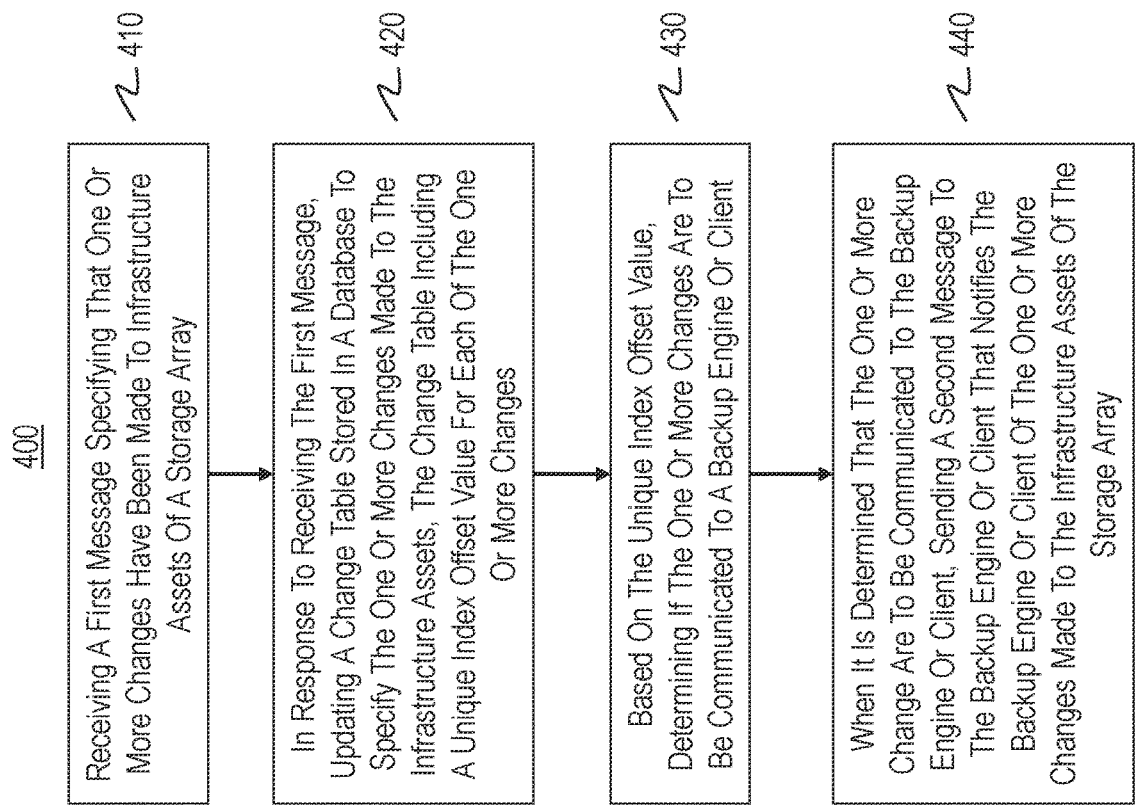
FIG. 4 discloses a method according to an embodiment.

It is noted with respect to the disclosed methods, including the example method of FIG. 4, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, an example method 400 for using a differential discovery service in a storage array is disclosed. The method 400 will be described in relation to one or more of the figures previously described, although the method 400 is not limited to any particular embodiment.

The method 400 includes receiving a first message specifying that one or more changes have been made to infrastructure assets of a storage array (410). For example, as previously described the differential discovery service 220 receives the publish message 203 via the Publish API of the API layer 230 from the storage array update module 270. The publish message 203 informs the differential discovery service 220 of the changes made to the assets of the storage array 210.

The method 400 includes in response to receiving the first message, updating a change table stored in a database to specify the one or more changes made to the infrastructure assets, the change table including a unique index offset value for each of the one or more changes (420). For example, as previously described the change tracker module 240 updates the change table 255 stored in the database 250 to specify the changes made to the assets of the storage array 210. The change table 255 includes the index offset values 340 for the changes recorded in the change table 255.

The method 400 includes based on the unique index offset value, determining if the one or more changes are to be communicated to a backup engine or client (430). For example, as previously described the change notification module 260 determines which changes need to be communicated to the backup engine or client 290 based on the index offset values 340. In particular, the change notification module 260 identifies the marker indicating the last index offset value 350 and then determines that any changes associated with offset index values greater than the last index offset value are to be communicated to the backup engine or client 290.

The method 400 includes when it is determined that the one or more change are to be communicated to the backup engine or client, sending a second message to the backup engine or client that notifies the backup engine or client of the one or more changes made to the infrastructure assets of the storage array (440). For example, as previously described the change notification module 260 sends the notification message 207 that notifies the backup engine or client 290 of the one or more changes made to the assets of the storage array 210.

D. Further Example Embodiments

Following are some further example embodiments of the invention. These are presented only by way of example and are not intended to limit the scope of the invention in any way.

Embodiment 1. A method, comprising: receiving a first message specifying that one or more changes have been made to infrastructure assets of a storage array; in response to receiving the first message, updating a change table stored in a database to specify the one or more changes made to the infrastructure assets, the change table including a unique index offset value for each of the one or more changes; based on the unique index offset value, determining if the one or more changes are to be communicated to a backup engine or client; and when it is determined that the one or more change are to be communicated to the backup engine or client, sending a second message to the backup engine or client that notifies the backup engine or client of the one or more changes made to the infrastructure assets of the storage array.

Embodiment 2. The method as recited in embodiment 1, further comprising: receiving a third message from the backup engine or client that requests that full details of the one or more changes made to the infrastructure assets be sent to the backup engine or client; and in response, sending the full details of the one or more changes made to the infrastructure assets to the backup engine or client for processing and storage at the backup engine or client.

Embodiment 3. The method as recited in any of embodiments 1-2, further comprising: receiving a fourth message from the backup engine or client which specifies which types of changes to the infrastructure assets that the backup engine or client is to be notified of, wherein the types of the infrastructure assets that the backup engine or client is to be notified of is stored as a preference in the database.

Embodiment 4. The method as recited in any of embodiments 1-3, wherein the one or more changes that have been made to the infrastructure assets includes one or more of adding one or more infrastructure assets, deleting one or more infrastructure assets, or updating one or more infrastructure assets.

Embodiment 5. The method as recited in any of embodiments 1-4, wherein the one or more infrastructure assets include one or more of volumes, volume groups, or storage groups.

Embodiment 6. The method as recited in any of embodiments 1-5, wherein the second message includes an asset identification (ID) for the infrastructure assets that have been changed and a description of the type of changes that have been made.

Embodiment 7. The method as recited in any of embodiments 1-6, wherein the change table includes an asset identification (ID) for the infrastructure assets that have been changed, a description of the type of infrastructure asset that has been changes, a description of the type of changes that have been made, the unique index offset value, and a marker indicating a last index offset value that has been communicated to the backup engine or client.

Embodiment 8. The method as recited in any of embodiments 1-7, wherein based on the unique index offset value, determining if the one or more changes are to be communicated to a backup engine or client comprises: accessing the change table to determine a last index offset value that has been communicated to the backup engine or client; and including in the second message only the one or more changes made to the infrastructure assets that are associated with a unique index offset value that is greater than the last index offset value.

Embodiment 9. The method as recited in any of embodiments 1-8, further comprising: in response to sending the second message to the backup engine or client, updating marker indicating a last index offset value that has been communicated to the backup engine or client; and including in the second message only the one or more changes made to the infrastructure assets that are associated with a unique index offset value that is greater than the last index offset value.

Embodiment 10. The method as recited in any of embodiments 1-9, wherein determining if the one or more changes are to be communicated to a backup engine occurs at predetermined time frequency.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
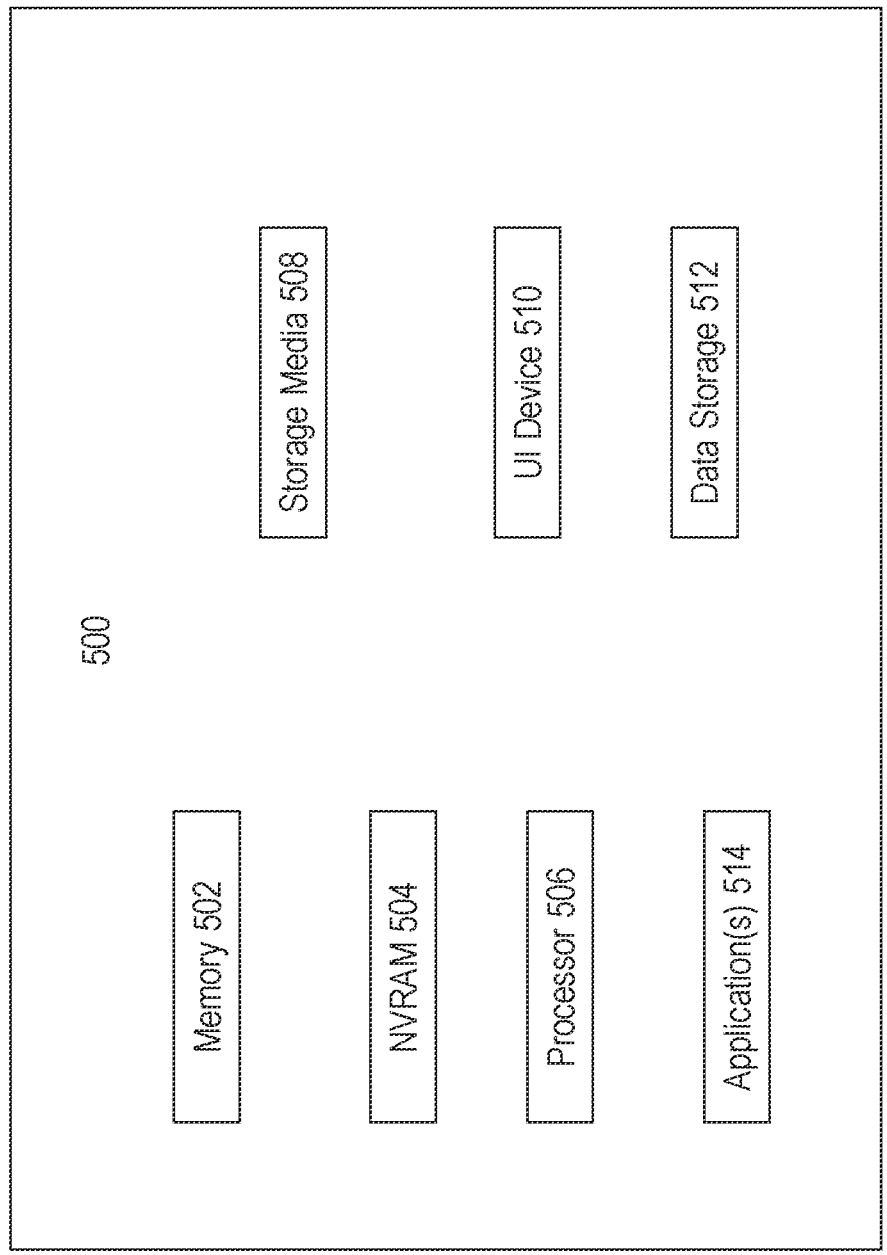
FIG. 5 discloses an example computing entity configured to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving a first message specifying that one or more changes have been made to infrastructure assets of a storage array;
    in response to receiving the first message, updating a change table stored in a database to specify the one or more changes made to the infrastructure assets, the change table including a unique index offset value for each of the one or more changes;
    based on the unique index offset value, determining if the one or more changes are to be communicated to a backup engine or client; and
    when it is determined that the one or more change are to be communicated to the backup engine or client, sending a second message to the backup engine or client that notifies the backup engine or client of the one or more changes made to the infrastructure assets of the storage array.

2. The method of claim 1, further comprising:
    receiving a third message from the backup engine or client that requests that full details of the one or more changes made to the infrastructure assets be sent to the backup engine or client; and
    in response, sending the full details of the one or more changes made to the infrastructure assets to the backup engine or client for processing and storage at the backup engine or client.

3. The method of claim 1, further comprising:
    receiving a fourth message from the backup engine or client which specifies which types of changes to the infrastructure assets that the backup engine or client is to be notified of,
    wherein the types of the infrastructure assets that the backup engine or client is to be notified of is stored as a preference in the database.

4. The method of claim 1, wherein the one or more changes that have been made to the infrastructure assets includes one or more of adding one or more infrastructure assets, deleting one or more infrastructure assets, or updating one or more infrastructure assets.

5. The method of claim 1, wherein the one or more infrastructure assets include one or more of volumes, volume groups, or storage groups.

6. The method of claim 1, wherein the second message includes an asset identification (ID) for the infrastructure assets that have been changed and a description of a type of changes that have been made.

7. The method of claim 1, wherein the change table includes an asset identification (ID) for the infrastructure assets that have been changed, a description of a type of infrastructure asset that has been changes, a description of a type of changes that have been made, the unique index offset value, and a marker indicating a last index offset value that has been communicated to the backup engine or client.

8. The method of claim 1, wherein based on the unique index offset value, determining if the one or more changes are to be communicated to a backup engine or client comprises:
    accessing the change table to determine a last index offset value that has been communicated to the backup engine or client; and
    including in the second message only the one or more changes made to the infrastructure assets that are associated with a unique index offset value that is greater than the last index offset value.

9. The method of claim 1, further comprising:
    in response to sending the second message to the backup engine or client, updating a marker indicating a last index offset value that has been communicated to the backup engine or client.

10. The method of claim 1, wherein determining if the one or more changes are to be communicated to a backup engine occurs at predetermined time frequency.

11. A non-transitory storage medium having stored therein instructions that are executable by one or more hardware processors to perform operations comprising:
    receiving a first message specifying that one or more changes have been made to infrastructure assets of a storage array;
    in response to receiving the first message, updating a change table stored in a database to specify the one or more changes made to the infrastructure assets, the change table including a unique index offset value for each of the one or more changes;
    based on the unique index offset value, determining if the one or more changes are to be communicated to a backup engine or client; and
    when it is determined that the one or more change are to be communicated to the backup engine or client, sending a second message to the backup engine or client that notifies the backup engine or client of the one or more changes made to the infrastructure assets of the storage array.

12. The non-transitory storage medium of claim 11, further comprising:
    receiving a third message from the backup engine or client that requests that full details of the one or more changes made to the infrastructure assets be sent to the backup engine or client; and
    in response, sending the full details of the one or more changes made to the infrastructure assets to the backup engine or client for processing and storage at the backup engine or client.

13. The non-transitory storage medium of claim 11, further comprising:
    receiving a fourth message from the backup engine or client which specifies which types of changes to the infrastructure assets that the backup engine or client is to be notified of,
    wherein the types of the infrastructure assets that the backup engine or client is to be notified of is stored as a preference in the database.

14. The non-transitory storage medium of claim 11, wherein the one or more changes that have been made to the infrastructure assets includes one or more of adding one or more infrastructure assets, deleting one or more infrastructure assets, or updating one or more infrastructure assets.

15. The non-transitory storage medium of claim 11, wherein the one or more infrastructure assets include one or more volumes, volume groups, or storage groups.

16. The non-transitory storage medium of claim 11, wherein the second message includes an asset identification (ID) for the infrastructure assets that have been changed and a description of a type of changes that have been made.

17. The non-transitory storage medium of claim 11, wherein the change table includes an asset identification (ID) for the infrastructure assets that have been changed, a description of a type of infrastructure asset that has been changes, a description of a type of changes that have been made, the unique index offset value, and a marker indicating a last index offset value that has been communicated to the backup engine or client.

18. The non-transitory storage medium of claim 11, wherein based on the unique index offset value, determining if the one or more changes are to be communicated to a backup engine or client comprises:

accessing the change table to determine a last index offset value that has been communicated to the backup engine or client; and including in the second message only the one or more changes made to the infrastructure assets that are associated with a unique index offset value that is greater than the last index offset value.

19. The non-transitory storage medium of claim 11, further comprising:

in response to sending the second message to the backup engine or client, updating a marker indicating a last index offset value that has been communicated to the backup engine or client.

20. The non-transitory storage medium of claim 11, wherein determining if the one or more changes are to be communicated to a backup engine occurs at predetermined time frequency.

\* \* \* \* \*